United States Patent [19]

Jeanes

[11] Patent Number: 4,851,014
[45] Date of Patent: Jul. 25, 1989

[54] GAS SEPARATION MEMBRANES DERIVED FROM POLYCARBONATES, POLYESTERS, AND POLYESTERCARBONATES CONTAINING TETRAFLUOROBISPHENOL F

[75] Inventor: Thomas O. Jeanes, Antioch, Calif.

[73] Assignee: The Dow Chemical Company, Midland, Mich.

[21] Appl. No.: 214,563

[22] Filed: Jul. 1, 1988

[51] Int. Cl.$^4$ .............................................. B01D 53/22
[52] U.S. Cl. .......................................... 55/16; 55/68; 55/158
[58] Field of Search ............................ 55/16, 68, 158; 210/500.23, 500.4

[56] References Cited

U.S. PATENT DOCUMENTS

| | | | |
|---|---|---|---|
| Re. 30,351 | 7/1980 | Hoehn et al. | 55/16 |
| 3,246,067 | 4/1966 | Boyer | 264/203 |
| 3,256,675 | 6/1966 | Robb | 55/16 |
| 3,615,024 | 10/1971 | Michaels | 210/490 |
| 3,653,180 | 4/1972 | Juliano et al. | 55/16 |
| 3,709,774 | 1/1973 | Kimura | 55/16 X |
| 3,945,926 | 3/1976 | Kesting | 264/41 |
| 4,032,309 | 6/1977 | Salemme | 55/158 |
| 4,048,271 | 9/1977 | Kesting | 264/41 |
| 4,075,108 | 2/1978 | Higley et al. | 264/41 X |
| 4,086,310 | 4/1978 | Bottenbruch et al. | 55/158 X |
| 4,195,157 | 3/1980 | Mark | 528/174 |
| 4,374,891 | 2/1983 | Ward | 428/220 |
| 4,717,393 | 1/1988 | Hayes | 55/16 |
| 4,772,392 | 9/1988 | Sanders, Jr. et al. | 210/500.23 |

FOREIGN PATENT DOCUMENTS

| | | |
|---|---|---|
| 136621 | 4/1985 | European Pat. Off. . |
| 0242147 | 10/1987 | European Pat. Off. ............. 55/158 |
| 53-066880 | 6/1978 | Japan ................................... 55/16 |
| 58-008506 | 1/1983 | Japan ................................... 55/158 |
| 58-008511 | 1/1983 | Japan ................................... 55/158 |
| 56107351 | 1/1983 | Japan . |
| 58-223411 | 12/1983 | Japan . |
| 59-22724 | 2/1984 | Japan . |
| 59-120206 | 7/1984 | Japan ................................... 55/16 |
| 62-204824 | 9/1987 | Japan . |
| 529183 | 9/1976 | U.S.S.R. . |
| 2011804 | 7/1979 | United Kingdom . |

OTHER PUBLICATIONS

Hellums et al., "Advanced Polycarbonate and Polysulfone Materials for Membrane-Based Gas Separation Applications," presented at the Second Annual North American Membrane Society Meeting, Syracuse, New York, Jun. 1-3, 1988.

Koros, "Research Group Report," presented to sponsors of the Separaton Research Program at the University of Texas at Austin, Oct. 21-22, 1986.

Koros et al., "Synthesis and Analysis of Novel Polymers with Potential for Providing Both High Permselectivity and Permeability in Gas Separation," a copy of a D.O.E. funding proposal, was distributed to sponsors of the Separation Research Program at the Univ. of Austin by Oct. 21-22, 1986.

Maruyama et al., "Synthesis and Properties of Polyarylates from 2,2-bis(4-hydroxyphenyl)-1,1,1,3,3,3-hexafluoropropane and Aromatic Diacid Chlorides," *Journal of Polymer Science: Part A: Polymer Chemistry Edition*, John Wiley & Sons, vol. 24, 1986, pp. 3555-3558.

Muruganandam, University of Texas at Austin, Separations Research Program, paper presented at fall meeting on Oct. 28-29, 1985.

Pilato et al., "Polymers for Permselective Membrane Gas Separations," *Polymer Preprints*, ACS. vol. 16, No. 2, Aug. 1975, pp. 41-46.

*Primary Examiner*—Robert Spitzer

[57] ABSTRACT

The invention is a semi-permeable membrane consituting a thin discriminating layer of bisphenolic polycarbonate, polyester, or polyestercarbonate, with a significant portion of the bisphenolic residues in the polymer backbone being based on tetrafluorobisphenol F. The invention also includes a method of separating gases using the described membrane.

19 Claims, No Drawings

GAS SEPARATION MEMBRANES DERIVED FROM POLYCARBONATES, POLYESTERS, AND POLYESTERCARBONATES CONTAINING TETRAFLUOROBISPHENOL F

BACKGROUND OF THE INVENTION

This invention relates to semi-permeable membranes derived from bisphenolic polycarbonates, polyesters, and polyestercarbonates containing tetrafluorobisphenol F. This invention further relates to the use of these membranes to separate gases.

The use of membranes to separate gases is well known in the art. Membranes have been used to recover or isolate a variety of gases, including hydrogen, helium, oxygen, nitrogen, carbon dioxide, methane, and light hydrocarbons. Applications of interest include the separation of carbon dioxide from light hydrocarbons or other crude oil components as part of the tertiary oil recovery process. In other embodiments, nitrogen or helium is separated from natural gas. Other applications include the recovery of an enriched oxygen stream from air for use in enhanced combustion processes. Alternately, an enriched nitrogen stream may be obtained from air for use as an inert atmosphere over flammable fluids or for food storage.

Such membrane separations are based on the relative permeability of two or more gaseous components through the membrane. To separate a gas mixture into two portions, one richer and one leaner in at least one component, the mixture is brought into contact with one side of a semi-permeable membrane through which at least one of the gaseous components selectively permeates. A gaseous component which selectively permeates through the membrane passes through the membrane more rapidly than at least one other component of the mixture. The gas mixture is thereby separated into a stream which is enriched in the selectively permeating component or components and a stream which is depleted in the selectively permeating component or components. The stream which is depleted in the selectively permeating component or components is enriched in the relatively non-permeating component or components. A relatively non-permeating component permeates more slowly through the membrane than at least one other component of the mixture. An appropriate membrane material is chosen for the mixture so that some degree of separation of the gas mixture can be achieved.

Membranes for gas separation have been fabricated from a wide variety of polymeric materials, including cellulose triacetate, polyolefins such as polyethylene, polypropylene, and poly-4-methylpentene-1, and polysulfone. An ideal gas separation membrane is characterized by the ability to operate under high temperature and/or pressure while possessing a high separation factor (selectivity) and high gas permeability. The problem is finding membrane materials which possess all the desired characteristics. Polymers possessing high separation factors generally have low gas permeabilities, while those polymers possessing high gas permeabilities generally have low separation factors. In the past, a choice between a high separation factor and a high gas permeability has been unavoidably necessary. Furthermore, some of the membrane materials previously used suffer from the disadvantage of poor performance under high operating temperatures and pressures. A membrane which possesses high selectivity, high gas permeability, and ability to operate under extreme conditions of temperature and pressure is needed.

SUMMARY OF THE INVENTION

In one aspect, the present invention is a semi-permeable membrane comprising a thin, continuous discriminating layer of bisphenolic polycarbonate, polyester, or polyestercarbonate, wherein a significant portion of the bisphenolic residues in the polymer backbone is based on tetrafluorobisphenol F, wherein the semi-permeable membrane is capable of separating at least one gas from a gas mixture.

In another aspect, the invention is a method of separating gases comprising (a) contacting one side of a semi-permeable membrane with a stream of a feed gas mixture under pressure, wherein the membrane divides a separation chamber into a higher pressure side into which the feed gas mixture is fed and a lower pressure side, wherein the membrane comprises a thin, continuous discriminating layer of bisphenolic polycarbonate, polyester, or polyestercarbonate, wherein a significant portion of the bisphenolic residues in the polymer backbone is based on tetrafluorobisphenol F;

(b) maintaining a pressure differential across the membrane under conditions such that at least one faster permeating component of the feed gas mixture selectively permeates through the membrane from the high pressure side to the low pressure side of the membrane;

(c) removing from the low pressure side of the membrane a stream of the permeated gas which is enriched in at least one faster permeating component; and (d) removing from the high pressure side of the membrane a stream of the nonpermeated gas which is depleted in at least one faster permeating component.

The membranes of this invention possess high selectivities for oxygen/nitrogen separation and carbon dioxide/methane separation with good gas permeabilities. The membranes of this invention also possess good mechanical properties so as to enable operation of the membranes at high temperatures and pressures.

DETAILED DESCRIPTION OF THE INVENTION

The semi-permeable membranes of this invention are prepared from bisphenolic polycarbonates, polyesters, or polyestercarbonates, wherein a significant portion of the bisphenolic residues in the polymer backbone is based on tetrafluorobisphenol F. Polyestercarbonates contain both ester and carbonate linkages as functional groups in the polymer backbone. The polyestercarbonates of this invention are randomized copolymers in which the ester and carbonate functional groups occur in a random arrangement along the polymer backbone.

the bisphenolic polycarbonates, polyesters, and polyestercarbonates of this invention preferably correspond to Formula 1:

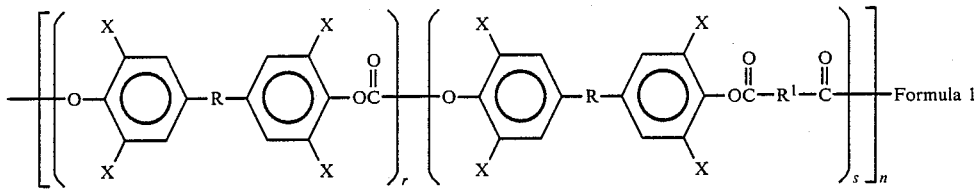

wherein

R is independently in each occurrence —CO—, —S—, —SO$_2$—, —O—, or a C$_{1-25}$ divalent hydrocarbon radical, an inertly substituted C$_{1-25}$ divalent hydrocarbon radical, or a C$_{1-25}$ divalent halocarbon radical, R$^1$ is independently in each occurrence a C$_{1-28}$ divalent hydrocarbon radical, an inertly substituted C$_{1-28}$ divalent hydrocarbon radical, or a C$_{1-28}$ divalent halocarbon radical, X is independently in each occurrence hydrogen, a halogen, a C$_{1-4}$ alkyl, a C$_{1-4}$ haloalkyl, or a C$_{1-4}$ alkoxy, with the proviso that a significant portion of the bisphenolic residues in the polymer backbone is based on tetrafluorobisphenol F;

r is a positive real number between 0 and 1 inclusive;

s is a positive real number between 0 and 1 inclusive; and n is a positive real number of about 20 or greater.

R is preferably —CO—, —S—, —SO$_2$—, or a C$_{1-6}$ divalent hydrocarbon radical, an inertly substituted C$_{1-6}$ divalent hydrocarbon radical, or a C$_{1-6}$ divalent halocarbon radical. R is more preferably a C$_{1-6}$ divalent hydrocarbon radical, even more preferably a C$_{1-6}$ divalent aliphatic hydrocarbon radical, most preferably a C$_{1-3}$ divalent aliphatic hydrocarbon radical.

R$^1$ is preferably an unsubstituted or halo-substituted C$_{1-18}$ divalent aliphatic radical, an unsubstituted or halo-substituted C$_{5-20}$ divalent cycloaliphatic radical, or an unsubstituted or halo-substituted C$_{6-20}$ divalent aromatic radical. More preferably, R$^1$ is described by Formulas 2-5:

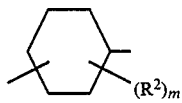

Formula 2

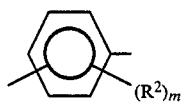

Formula 3

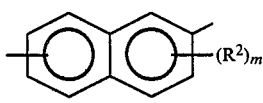

Formula 4

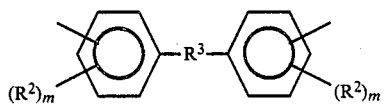

Formula 5 wherein R$^2$ is independently in each occurrence a halogen, an unsubstituted or halo-substituted C$_{1-4}$ alkyl, or phenyl; m is independently in each occurrence a positive integer from 0 to 4; and R$^3$ is independently in each occurrence an unsubstituted, inertly-substituted, or halo-substituted C$_{1-6}$ divalent hydrocarbon radical. Most preferably, R$^1$ is described by Formula 6:

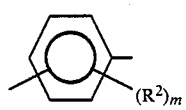

Formula 6 wherein R$^2$ and m are as previously described.

X is preferably hydrogen, chlorine, bromine, fluorine, methyl, ethyl, methoxy, or ethoxy; X is more preferably hydrogen, chlorine, bromine, fluorine, or methyl.

The ratio of ester to carbonate groups (s/r) in the polyestercarbonates is preferably about 0.05 to about 9, more preferably from about 0.25 to about 1.

n is preferably about 25 or greater.

The bisphenolic polycarbonates, polyesters, and polyestercarbonates useful in this invention are substantially prepared from tetrafluorobisphenol F, that is, bis(3,5-difluoro-4-hydroxyphenyl)methane, which corresponds to Formula 7:

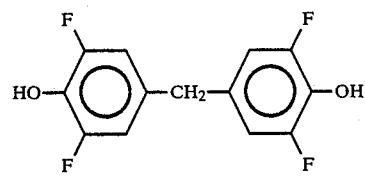

Formula 7

Preferably at least about 5 mole percent of the bisphenolic residues in the polymers of this invention are based on tetrafluorobisphenol F, more preferably at least about 20 mole percent of the bisphenolic residues are based on tetrafluorobisphenol F, even more preferably at least about 30 mole percent of the bisphenolic residues are based on tetrafluorobisphenol F. Tetrafluorobisphenol F may be obtained by dissolving 2,6-difluorophenol in methanol and reacting with sulfuric acid as a catalyst and co-solvent at about 0° to about 20° C. for about 22 hours. The tetrafluorobisphenol F may be purified by dissolving in methanol and reprecipitating in water prior to drying.

The bisphenolic polycarbonates, polyesters, and polyestercarbonates useful in this invention may be prepared by any process known in the art which results in polymers with suitable membrane formation properties. For example, polycarbonates containing tetrafluorobisphenol F may be produced by the reaction of phodgene and any of the appropriate bisphenols in the presence of an HCl acceptor such as pyridine. Such polycarbonates may also be prepared by a transesterification reaction between any of the appropriate bisphenols and a carbonate ester such as diphenyl carbonate. See *Kirk-Othmer Encyclopedia of Chemical Technology*, 3rd edition, John Wiley & Sons, New York, 1982, vol. 18, pp. 479–494 and Ferdinand Rodriguez, *Principles of*

*Polymer Systems,* 2nd edition, Hemisphere Publishing Corporation, McGraw-Hill Book Company, 1982, pp. 433–436; the relevant portions incorporated herein by reference.

Polyesters containing tetrafluorobisphenol F may be prepared by the interfacial process by reacting any of the appropriate bisphenols including tetrafluorobisphenol F with an acid dihalide such as isophthaloyl chloride or terephthaloyl chloride. For example, the appropriate bisphenols may be dissolved in a mixture of water and sodium hydroxide. Optionally, a phase transfer catalyst such as tetraethyl ammonium bromide in methylene chloride may be added to the bisphenol solution. The acid dihalide in methylene chloride is added to the bisphenol solution at about 20° C. with agitation under a nitrogen atmosphere for a time sufficient for the reaction to occur. Following reaction, the phases are separated and the polymer recovered. For other conventional polyester synthesis methods, see *Kirk-Othmer Encyclopedia of Chemical Technology,* 3rd edition, John Wiley & Sons, New York, 1982, vol. 18, pp. 531–593 and Ferdinand Rodriguez, *Principles of Polymer Systems,* 2nd, edition, Hemisphere Publishing Corporation, McGraw-Hill Book Company, 1982, pp. 431–437; the relevant portions incorporated herein by reference.

Polyestercarbonates containing tetrafluorobisphenol F may be prepared by the solution process. In the solution process, any of the appropriate bisphenols in a chlorinated solvent in the presence of a tertiary amine acid acceptor are contacted with a dicarboxylic acid or acid dichloride in the presence of phosgene with agitation. See U.S. Pat. Nos. 3,028,365; 4,194,038; and 4,310,652; all incorporated herein by reference. See also P. W. Morgan, *Condensation Polymers: By Interfacial and Solution Methods,* Interscience, 1965, pp. 325–393, the relevant portions incorporated herein by reference.

Alternately, in the interfacial process for preparing polyestercarbonates containing tetrafluorobisphenol F, an aqueous bisphenolate solution with a pH of at least about 8 is mixed with phosgene and an organic solution of an acid dihalide which solution is immiscible with the aqueous bisphenolate solution. The said components are agitated for a sufficient time at a temperature sufficient so as to react the phosgene and the acid dihalide with the bisphenolate to form an amorphous polymer. The aqueous phase containing the amorphous polymer is separated from the organic phase. The organic phase is then washed with an aqueous liquid. An amorphous, melt-processable polyestercarbonate polymer is recovered from the washed organic phase. The organic phase may be based upon any conventional organic solvent for the product polymer. A preferred group of solvents includes chlorinated $C_{1-4}$ aliphatic hydrocarbons such as methylene chloride, dichloromethane, chloroform, carbon tetrachloride, dichloroethane, trichloroethane, trichloroethylene, tetrachloroethylene, and mixtures thereof. Another preferred group of solvents includes chlorinated and non-halogenated aromatic hydrocarbons such as toluene, chlorobenzene, dichlorobenzene, and mixtures thereof. Preferred solvents are the chloromethanes, especially dichloromethane. The bisphenols useful in this invention are converted to bisphenoates by dissolving the bisphenol in water with an inorganic base, especially in an aqueous or alkaline earth metal hydroxide, preferably an alkali metal hydroxide, and more preferably sodium hydroxide. Further descriptions of the interfacial processes can be found in U.S. Pat. Nos. 3,028,364; 3,030,331; 3,169,121; 3,207,814; 4,137,128; 4,156,069; 4,255,556; and 4,311,822; all incorporated herein by reference. See also P. W. Morgan, supra.

The ratio of phosgene to acid dihalide or dicarboxylic acid generally controls the relative ratio of ester to carbonate units, with a higher ratio of acid dihalide or dicarboxylic acid resulting in a higher ester content and a lower ratio of acid dihalide or dicarboxylic acid resulting in a lower ester content. Generally, the molar ratio of phosgene to acid dihalide or dicarboxylic acid is between about 0.02:1 to 20:1.

Polycarbonates, polyesters, and polyestercarbonates containing tetrafluorobisphenol F may also be produced by the melt acidolysis process. For example, a polyester copolymer may be formed from 3,3',5,5'-tetrafluorobisphenol F and any of the appropriate bisphenols such as bisphenol A by first converting the bisphenols to the diacetate derivatives by reacting the bisphenols at elevated temperatures with an excess of acetic anhydride. On cooling, crystals of the diacetates are collected by filtration. The diacetates of the bisphenols may be further purified by recrystallization from acetic anhydride. An appropriate amount of the diacetates of the bisphenols are placed in a polymerization tube with a dicarboxylic acid such as terephthalic acid or isophthalic acid. The atmosphere of the reaction tube is evacuated and charged with nitrogen. The contents of the reaction tube are heated under a nitrogen purge to a temperature for a time sufficient to polymerize the monomers, for example, in the range from about 280° to about 340° C. for up to several hours. Following the reaction, a vacuum is applied to remove the final traces of acetic acid by product. The polymerization product is removed by solution with a hot solvent such as dimethylacetamide and isolated by precipitation on addition of heptane to the solution. For another example of a melt polymerization process for polyesters, see U.S. Pat. No. 4,612,360, incorporated herein by reference.

In the case of polycarbonates, polyesters, and polyestercarbonates containing greater than about 50 mole percent tetrafluorobisphenol F, melt acidolysis is the preferred polymer synthesis route.

The polymers useful in this invention preferably possess a weight average molecular weight of at least about 10,000, more preferably of at least about 20,000. The weight average molecular weight of the polymers is preferably less than about 75,000, more preferably less than about 55,000. The inherent viscosity of the polymers useful in this invention as measured in methylene chloride at about 25° C. is preferably between about 0.25 to about 1.0 dL/g, more preferably between about 0.40 to about 0.80 dL/g.

The membranes of this invention may be homogenous, composite, or asymmetric membranes. Preferably, the membranes of this invention are asymmetric or composite. The membranes of this invention may be shaped in the form of flat sheets, hollow fibers, or hollow tubes.

Homogeneous membranes are prepared by forming a thin, continuous discriminating layer which is dense and free of voids and pores. Such membranes or layers generally have the same structure and composition throughout the membrane. In one preferred embodiment, the bisphenolic polycarbonate, polyester, or polyestercarbonate membranes of this invention are prepared by dissolving the polymer in a solvent. Solvents which are suitable for forming membranes include chlorinated hydrocarbons such as methylene chloride, chloroform, trichlorethane, trichloroethylene, tetrachloroethylene, and the like. Additional solvents include aprotic solvents such as dimethylsulfoxide, n-methylpyrrolidone, dimethylformamide, and dimethylacetamide. The form into which the membrane is to be fabricated affects the membrane solution composition; to form a flat sheet membrane, a solution with about 10 to about 30 weight percent of polymer is preferred, with about 15 to about 20 weight percent of polymer being more preferred. To form a hollow fiber membrane, a solution with about 30 to about 80 weight percent polymer is preferred, with about 50 to about 80 weight percent polymer being more preferred.

The polymer solution is preferably homogeneous and possesses sufficient viscosity to allow casting of the solution onto a smooth support surface. In the casting of a homogenous membrane, the casting surface is such that the finished membrane may thereafter be readily separated from the casting surface. A convenient way of carrying out this operation is either by casting the polymer solution onto a support surface which may be dissolved away from the finished membrane following drying and curing or by casting the membrane onto a support surface having a low surface energy, such as silicone, coated glass, or a surface to which the membrane will not adhere, such as mercury. Casting is performed by pouring the solution onto the appropriate surface and drawing down the polymer solution using an appropriate tool to form a solution of the appropriate thickness. A continuous casting process may be achieved by casting the solution onto endless belts or rotating drums.

Thereafter, the cast solution is exposed to drying or curing conditions. Such conditions are used to remove the solvent, thereby leaving a thin discriminating layer of polymer which is homogeneous. The solution can be dried either by exposing the solution to a vacumm, by exposing the solution to elevated temperatures, by allowing the solvent to evaporate from the solution over time, or a combination thereof. Generally, it is preferable to expose the cast solution to elevated temperatures, that is, temperatures above ambient. Any temperature at which the solvent evaporates in a reasonable period of time and is below the glass transition temperature of the membrane is operable. The temperature is preferably less than about 100° C., more preferably less than about 80° C. In one preferred embodiment, such exposure is done under vacuum at such elevated temperatures. Such drying is performed over a period sufficient to remove the solvent, preferably between about 24 to about 48 hours.

Homogeneous polycarbonate, polyester, and polyestercarbonate membranes may alternately be formed by the melt extrusion process. The polymers may be extruded and drawn down into films or fibers using conventional extrusion equipment. Typically the polymers of this invention may be extruded at temperatures from about 280° to about 340° C. Such procedures are well known in the art.

In a composite membrane, the thin, continuous discriminating layer of the membrane is supported on a porous substructure or substrate of a material different than the membrane discriminating layer. The porous substrate generally should be one which does not greatly impede the transport of components through the membrane. To prepare a composite membrane, a homogeneous, thin, continuous discriminating layer can be formed and thereafter adhered to a porous support after formation. Alternatively, the porous support can be the surface upon which the membrane is cast or laminated. In one embodiment, the composite membrane is prepared by casting or laminating a solution as a uniform continuous coating on the porous support which forms the support layer for the finished membrane. Penetration of the polymer into pores of the porous support layer is operable so long as the desired thickness of the semi-permeable membrane is not exceeded. In one embodiment, the support layer may be a metal or polymeric plate with a plurality of holes drilled through it. However, such a drilled plate is not advantageous because it can significantly reduce the effective surface area of the membrane. In a preferred embodiment, the porous support layer is a very porous polymer membrane. Illustrative of such polymeric support layers are microporous cellulose ester and microporous polysulfone membranes. Such membranes are commercially available under the tradenames MILLIPORE, PELLICON, and DIAFLOW. Where such support membranes are thin or highly deformable, a screen or other support means may also be employed to adequately support the semi-permeable membrane. In one especially preferred embodiment, the polymeric support layer is a microporous hollow fiber of a polymer such as cellulose ester or polysulfone. The hollow fiber itself provides adequate support for the thin, continuous discriminating layer coated on the inside or the outside of the hollow fiber. After the thin discriminating layer is coated onto the porous support, the composite membrane is exposed to conditions for removal of the solvent so as to form the desired dense skin. Such conditions are similar to those hereinbefore described for the formation of homogeneous membranes.

To form an asymmetric membrane, a solution may be cast or extruded as hereinbefore described and the solution partially cured to remove a portion of the solvent. Thereafter, one or both surfaces of the partially dried membrane is contacted with a water quench so as to form a thin discriminating layer on one or both sides of the membrane under conditions such that the solvent away from the dense layer forms pores in the remainder of the membrane, thereby forming an asymmetric membrane. Such a porous layer provides support for the thin discriminating layer without impeding the transport of the fluid containing the components to be separated by the discriminating layer. The partial curing step is performed in a manner similar to the curing step described with respect to the formation of homogeneous membranes.

Hollow fiber membranes can be formed by spinning fibers from an appropriate solution of the polycarbonate, polyester, or polyestercarbonate in a solvent or by melt extrusion. Such spinning is well known to those skilled in the art, and the formation of homogeneous, asymmetric, or composite membranes requires the adaptation of the hereinbefore described procedures to the hollow fiber membrane form. Such adaptations are well within the skill of the art.

The membranes used in the invention are relatively thin. The thickness of such homogeneous membranes is preferably greater than about 5 microns and less than about 500 microns. More preferably, the membrane thickness for a homogeneous membrane is between about 10 and about 300 microns. In the case of composite or asymmetric membranes, the discriminating layer of the membrane is preferably between about 0.05 and about 10 microns, more preferably between about 0.05 and about 5 microns.

The membranes are fabricated into flat sheet, spiral, tubular, or hollow fiber devices by methods described in the art. The membranes are sealingly mounted in a pressure vessel in such a manner that the membrane separates the vessel into two fluid regions wherein fluid flow between the two regions is accomplished by fluid permeating through the membrane. For examples of conventional membrane device designs and fabrication procedures, see U.S. Pat. Nos. 3,228,876; 3,433,008; 3,455,460; 3,475,331; 3,526,001; 3,538,553; 3,690,465; 3,702,658; 3,755,034; 3,801,401; 3,872,014; 3,966,616; 4,045,851; 4,061,574; 4,080,296; 4,083,780; 4,220,535; 4,235,723; 4,265,763; 4,430,219; 4,352,092; 4,337,139; and 4,315,819; all incorporated herein by reference.

The membranes are used to isolate or recover gases from gas mixtures. The feed gas mixtures may contain gases such as hydrogen, helium, oxygen, nitrogen, carbon dioxide, methane, light hydrocarbons, and the like. The membrane divides a separation chamber into two regions, a higher pressure side into which the feed mixture is introduced and a lower pressure side. One side of the membrane is contacted with a feed gas mixture under pressure, while a pressure differential is maintained across the membrane. To be useful, at least one of the components in any given gas mixture selectively passes through the membrane more rapidly than the other component or components in the mixture. A stream is obtained on the low pressure side of the membrane which is enriched in at least one faster permeating component. The permeated gas is removed from the low pressure (downstream) side of the membrane. A stream depleted in at least one faster permeating gas is withdrawn from the high pressure (upstream) side of the membrane.

The separation process should be carried out at pressures which do not adversely affect the membrane, that is, pressures which do not cause the membrane to mechanically fail. In the case in which oxygen is separated from nitrogen, the pressure differential across the membrane is preferably between about 10 and 350 psig, more preferably between about 50 and 250 psig. In the case in which carbon dioxide is separated from methane, the pressure differential across the membrane is preferably between about 50 and 1000 psig, more preferably between about 50 and 500 psig. The separation process should be carried out at temperatures which do not adversely affect membrane integrity. Under continuous operation, the operating temperature is preferably in the range of from about 0° to about 100° C., more preferably from about 0° to about 50° C.

Gas permeability is defined as $$P = \frac{(\text{amount of permeant})(\text{membrane thickness})}{(\text{area})(\text{time})(\text{driving force across the membrane})}.$$

A standard permeability measurement unit is the Barrer (Ba), which is equal to $$\frac{(\text{centimeter }(STP))^3 (\text{centimeter})}{(\text{centimeter})^2 (\text{second})(\text{centimeter Hg})} \times 10^{-10},$$

abbreviated hereinafter as $$\frac{\text{cm}^3 (STP)\, \text{cm}}{\text{cm}^2\, \text{s cm Hg}} \times 10^{-10}.$$

The reduced flux is defined as (permeability) X (membrane thickness). A standard reduced flux unit is $$\frac{(\text{centimeter})^3 (STP)}{(\text{centimeter})^2 (\text{second})(\text{centimeter Hg})} \times 10^{-6},$$

abbreviated hereinafter as $$\frac{\text{cm}^3 (STP)}{\text{cm}^2\, \text{s cm Hg}} \times 10^{-6}.$$

The separation factor (selectivity) is defined as the ratio of the permeability of the faster permeating gas to the permeability of the slower permeating gas.

In the embodiment where oxygen is separated from nitrogen, the membrane preferably has a separation factor for oxygen/nitrogen at about 25° C. of about 3.0 or greater, more preferably of about 3.5 or greater. The permeability of oxygen at about 25° C. is preferably of about 0.6 barrers or greater, more preferably of about 0.8 barrers or greater. The reduced flux for oxygen is preferably at least about $2.3 \times 10^{-8}$ $$\frac{\text{cm}^3 (STP)}{\text{cm}^2\, \text{s cm Hg}}$$

or greater, more preferably at least about $3.2 \times 10^{-8}$ $$\frac{\text{cm}^3 (STP)}{\text{cm}^2\, \text{s cm Hg}}$$

or greater. In the embodiment where carbon dioxide is separated from methane, the membrane preferably has a separation factor for carbon dioxide/methane at about 25° C. of at least about 15 or greater, more preferably of at least about 20 or greater. The permeability of carbon dioxide at about 25° C. is at least about 4 barrers or greater, more preferably at least about 5 barrers or greater. The reduced flux for carbon dioxide is preferably at least about $15.7 \times 10^{-8}$ $$\frac{\text{cm}^3 (STP)}{\text{cm}^2\, \text{s cm Hg}}$$

or greater, more preferably at least about $19.7 \times 10^{-8}$ $$\frac{\text{cm}^3 (STP)}{\text{cm}^2\, \text{s cm Hg}}$$

or greater.

SPECIFIC EMBODIMENTS

The following examples are presented to illustrate the invention only and are not intended to limit the scope of the invention or claims. Examples 1 and 2 illustrate the synthesis method used for polymers containing tetrafluorobisphenol F and are not directed to the claimed invention.

Example 1

Synthesis of Polycarbonate from 3,3',5,5'-tetrafluorobisphenol F

Into a small 2 ounce bottle containing a magnetic stirring bar is poured about 15 milliliters of methylene chloride and about 2.1 milliliters of pyridine. About 2.7 grams of 3,3',5,5'-tetrafluorobisphenol F is slowly added to the solution while stirring. The bottle is placed in an ice bath while stirring is continued. About 2.0 milliliters of about a 252.6 gram/liter phosgene solution is added to the cooled solution, resulting in the formation of gel-like solids. Stirring is continued overnight, after which solids are still present in the solution. About 2.0 milliliters of the phosgene solution is again added with the same results. Stirring is continued while about an additional 1.0 milliliter of phosgene solution is added. The polymer solution is then diluted to about 50 milliliters with methylene chloride, acidified with about 20 milliliters of about 1 N HCl, phase separated, and precipitated in 4 volumes of methanol. A white solid weighing about 1.8 grams corresponding to about 60 percent yield is recovered by filtration. The same is insoluble in chloroform, methylene chloride, tetrachloroethane, trifluoroacetic acid, sulfuric acid, trifluoroethanol, and trifluoroethanol/nitromethane. A differential scanning calorimetry (DSC) scan at 10° C./minute indicates a melting temperature ($T_m$) peak of about 190° C. while a second scan shows a glass transition temperature ($T_g$) deflection peak at about 154° C. When the scan temperature exceeds about 400° C., no deflections are apparent on subsequent scans.

Example 2

Synthesis of Polycarbonate Co-polymer from 3,3',5,5'-Tetrafluorobisphenol F and Bisphenol A A procedure similar to that outlined in Example 1 is followed except that about 67 mole percent of the required bisphenol used is bisphenol A rather than 3,3',5,5'-tetrafluorobisphenol F. A white solid is recovered by precipitation in methanol. The solid is soluble in methylene chloride and possesses an inherent viscosity of about 0.088 dL/g as measured in methylene chloride at about 25° C.

Example 3

Gas Separation Membranes from Polycarbonate Co-polymer Synthesized from 3,3',5,5'-Tetrafluorobisphenol F and Bisphenol A A procedure similar to that outlined in Example 1 is followed except that about 90 mole percent of the required bisphenol used is bisphenol A rather than 3,3',5,5'-tetra-fluorobisphenol F. The resulting white solid possesses an inherent viscosity of about 0.417 dL/g as measured in methylene chloride at about 25° C. The DSC scan shows a $T_g$ whose onset is about 141° C. and an inflection point of about 144° C. A film cast from this material is evaluated for gas permeability and selectivity. Membrane gas separation properties are measured using a constant volume-variable pressure gas permeation apparatus. Literature sources describe such apparatus and measurement techniques. See *Methods of Experimental Physics*, vol. 16c, Academic Press, Inc., 1980, pp. 315–377 and Pye, Hoehn, and Panar, "Measurement of Gas Permeability of Polymers. 1. Permeabilities in Constant Volume/Variable Pressure Apparatus," *Journal of Applied Polymer Science*, vol. 20, 1976, pp. 1921–1931, incorporated herein by reference. Gas permeability values are determined using single gas feed at about 25° C. at about 36 psi (250 kPa) absolute pressure.

The gas permeability value measured in barrers is about 0.942 for oxygen, 0.214 for nitrogen, 4.728 for carbon dioxide, 0.212 for methane, and 7.085 for helium. The selectivity for oxygen/nitrogen is about 4.4, for carbon dioxide/methane is about 22.2, and for helium/methane is about 33.4.

What is claimed is:

1. A method of separating gases comprising
   (a) contacting one side of a semi-permeable membrane with a stream of a feed gas mixture under pressure, wherein the membrane divides a separation chamber into a higher pressure side into which the feed gas mixture is fed and a lower pressure side, wherein the membrane comprises a thin, continuous discriminating layer of bisphenolic polycarbonate, polyester, or polyestercarbonate, wherein a significant portion of the bisphenolic residues in the polymer backbone is based on tetrafluorobisphenol F;
   (b) maintaining a pressure differential across the membrane under conditions such that at least one faster permeating component of the feed gas mixture selectively permeates through the membrane from the high pressure side to the low pressure side of the membrane;
   (c) removing from the low pressure side of the membrane a stream of the permeated gas which is enriched in at least one faster permeating component; and
   (d) removing from the high pressure side of the membrane a stream of the non-permeated gas which is depleted in at least one faster permeating component.

2. A method of separating gases comprising
   (a) contacting one side of the semi-permeable membrane with a stream of a feed gas mixture under pressure, wherein the membrane divides a separation chamber into a higher pressure side into which the feed gas mixture is fed and a lower pressure side, wherein the membrane comprises a thin, continuous discriminating layer of bisphenolic polyester or polyestercarbonate, wherein a significant portion of the bisphenolic residues in the polymer backbone is based on tetrafluorobisphenol F;
   (b) maintaining a pressure differential across the membrane under conditions such that at least one faster permeating component of the feed gas mixture selectively permeates through the membrane from the high pressure side to the low pressure side of the membrane;
   (c) removing from the low pressure side of the membrane a stream of the permeated gas which is enriched in at least one faster permeating component; and
   (d) removing from the high pressure side of the membrane a stream of the non-permeated gas which is depleted in at least one faster permeating component.

3. A method of separating gases comprising
   (a) contacting one side of a semi-permeable membrane with a stream of a feed gas mixture under pressure, wherein the membrane divides a separation chamber into a higher pressure side into which the feed gas mixture is fed and a lower pressure side, wherein the membrane comprises a thin, continuous discriminating layer of bisphenolic polycarbonate, polyester, or polyestercarbonate corresponding to the formula:

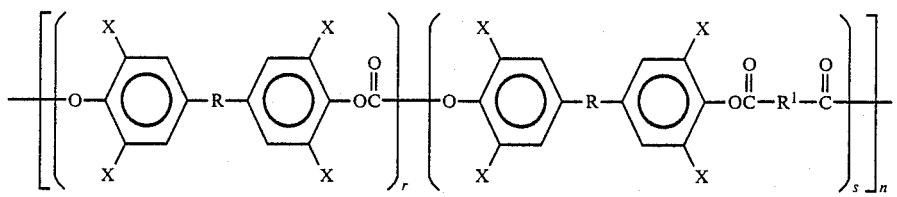

wherein
R is independently in each occurrence —CO—, —S—, SO$_2$—, —O—, or a C$_{1-25}$ divalent hydrocarbon radical, an inertly substituted C$_{1-25}$ divalent hydrocarbon radical, or a C$_{1-25}$ divalent halocarbon radical,
R$_1$ is independently in each occurrence a C$_{1-28}$ divalent hydrocarbon radical, an inertly substituted C$_{1-28}$ divalent hydrocarbon radical, or a C$_{1-28}$ divalent halocarbon radical,
X is independently in each occurrence hydrogen, a halogen, a C$_{1-4}$ alkyl, a C$_{1-4}$ haloalkyl, or a C$_{1-4}$ alkoxy, with the proviso that a significant portion of the bisphenolic residues in the polymer backbone are based on tetrafluorobisphenol F;
r is a positive real number between 0 and 1 inclusive;
s is a positive real number between 0 and 1 inclusive; and
n is a positive real number of about 20 or greater;
(b) maintaining a pressure differential across the membrane under conditions such that at least one faster permeating component of the feed gas mixture selectively permeates through the membrane from the high pressure side to the low pressure side of the membrane;
(c) removing from the low pressure side of the membrane a stream of the permeated gas which is enriched in at least one faster permeating component; and
(d) removing from the high pressure side of the membrane a stream of the non-permeated gas which is depleted in at least one faster permeating component.

4. A semi-permeable membrane comprising a thin, continuous discriminating layer of bisphenolic polycarbonate, polyester, or polyestercarbonate, wherein a significant portion of the bisphenolic residues in the polymer backbone is based on tetrafluorobisphenol F, wherein the semi-permeable membrane is capable of separating at least one gas from a gas mixture.

5. A semi-permeable membrane comprising a thin, continuous discriminating layer of bisphenolic polycarbonate, polyester, or polyestercarbonate corresponding to the formula:

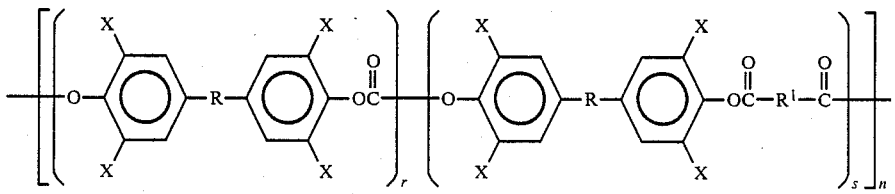

wherein
R is independently in each occurrence —CO—, —S—, SO$_2$—, —O—, or a C$_{1-25}$ divalent hydrocarbon radical, an inertly substituted C$_{1-25}$ divalent hydrocarbon radical, or a C$_{1-215}$ divalent halocarbon radical,
R$_1$ is independently in each occurrence a C$_{1-28}$ divalent hydrocarbon radical, an inertly substituted C$_{1-28}$ divalent hydrocarbon radical, or a C$_{1-28}$ divalent halocarbon radical,
X is independently in each occurrence hydrogen, a halogen, a C$_{1-4}$ alkyl, a C$_{1-4}$ haloalkyl, or a C$_{1-4}$ alkoxy, with the proviso that a significant portion of the bisphenolic residues in the polymer backbone are based on tetrafluorobisphenol F;
r is a positive real number between 0 and 1 inclusive;
s is a positive real number between 0 and 1 inclusive;
and n is a positive real number of about 20 or greater; wherein the semi-permeable membrane is capable of separating at least one gas from a gas mixture.

6. The membrane of claim 5 wherein at least about 5 mole percent of the bisphenolic residues in the polymer backbone are based on tetrafluorobisphenol F.

7. The membrane of claim 6 wherein R$^1$ is preferably an unsubstituted or halo-substituted divalent C$_{1-8}$ aliphatic radical, an unsubstituted or halo-substituted divalent C$_{5-20}$ cycloaliphatic radical, or an unsubstituted or halo-substituted divalent C$_{6-20}$ aromatic radical.

8. The membrane of claim 7 wherein R$^1$ is

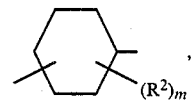

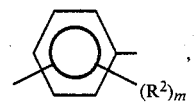

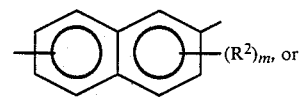

-continued

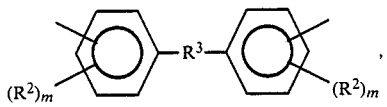

wherein
$R^2$ is independently in each occurrence a halogen, an unsubstituted or halo-substituted $C_{1-4}$ alkyl, or phenyl;
m is independently in each occurrence a positive integer from 0 to 4; and
$R^3$ is independently in each occurrence an unsubstituted, inertly-substituted, or halo-substituted $C_{1-6}$ divalent hydrocarbon radical.

9. The membrane of claim 8 wherein $R^1$ is

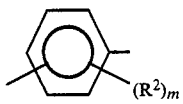

wherein
$R^2$ is independently in each occurrence a halogen, an unsubstituted or halo-substituted $C_{1-4}$ alkyl, or phenyl;
m is independently in each occurrence a positive integer from 0 to 4; and
$R^3$ is independently in each occurence an unsubstituted, inertly-substituted or halo-substituted $C_{1-6}$ divalent hydrocarbon radical.

10. The membrane of claim 9 wherein the ratio of ester to carbonate groups in the polyestercarbonates is from about 0.05 to about 9.

11. The membrane of claim 10 wherein R is a $C_{1-6}$ divalent hydrocarbon radical.

12. The membrane of claim 11 wherein R is a $C_{1-3}$ divalent aliphatic hydrocarbon radical.

13. The membrane of claim 12 wherein X is hydrogen, chlorine, bromine, fluorine, methyl, ethyl, methoxy, or ethoxy.

14. The membrane of claim 13 wherein the inherent viscosity of the polymer in methylene chloride at about 25° C. is from about 0.25 to about 1.0 dL/g.

15. The membrane of claim 14 wherein the separation factor for oxygen/nitrogen at about 25° C. is at least about 3.5.

16. The membrane of claim 15 wherein the reduced flux for oxygen is at least about $2.3 \times 10^{-8}$ $$\frac{cm^3 \ (STP)}{cm^2 \ s \ cm \ Hg}.$$

17. The membrane of claim 14 wherein the separation factor for carbon dioxide/methane at about 25° C. is at least about 15.

18. The membrane of claim 17 wherein the reduced flux for carbon dioxide is at least about $15.7 \times 10^{-8}$ $$\frac{cm^3 \ (STP)}{cm^2 \ s \ cm \ Hg}.$$

19. A semi-permeable membrane comprising a thin, continuous discriminating layer of bisphenolic polyestercarbonate or polyester, wherein a significant portion of the bisphenolic residues in the polymer backbone is based on tetrafluorobisphenol F, wherein the semipermeable membrane is capable of separating at least one gas from a gas mixture.

* * * * *

UNITED STATES PATENT AND TRADEMARK OFFICE
CERTIFICATE OF CORRECTION

PATENT NO. : 4,851,014
DATED : July 25, 1989
INVENTOR(S) : Thomas O. Jeanes

It is certified that error appears in the above-identified patent and that said Letters Patent is hereby corrected as shown below:

On cover sheet, in OTHER PUBLICATIONS, line 7, "Separation" has been misspelled;

Col. 2, line 66, delete "the" and insert -- The --;

Col. 4, line 61, "phosgene" has been misspelled;

Col. 7, line 37, "vacuum" has been misspelled;

Col. 11, line 23, delete "same" and insert -- sample --;

Col. 14, line 15, delete "$C_{1-215}$" and insert -- $C_{1-25}$ --.

Signed and Sealed this

Ninth Day of April, 1991

Attest:

HARRY F. MANBECK, JR.

Attesting Officer

Commissioner of Patents and Trademarks